United States Patent

Nomura et al.

[15] 3,647,374
[45] Mar. 7, 1972

[54] METHOD FOR SEPARATING ALCOHOLS AND HYDRATED ALUMINA FROM HYDROLYSTS PRODUCTS OF ALUMINUM ALKOXIDES

[72] Inventors: Kazuhumi Nomura; Kunio Nakazato; Hideki Matsui, all of Niihama-shi, Japan

[73] Assignee: Sumitomo Chemical Company, Ltd., Osaka, Japan

[22] Filed: Aug. 21, 1968

[21] Appl. No.: 754,486

[30] Foreign Application Priority Data

Aug. 29, 1967 Japan..................................42/55686

[52] U.S. Cl..................................23/143, 260/632, 210/83
[51] Int. Cl..................C01f 7/36, C07c 29/12, B01d 17/00
[58] Field of Search ........................23/143; 260/448, 632 D

[56] References Cited

UNITED STATES PATENTS

| | | | |
|---|---|---|---|
| 2,636,865 | 4/1953 | Kimberlin, Jr. | 23/143 X |
| 2,762,782 | 9/1956 | Kimberlin et al. | 23/143 UX |
| 2,863,895 | 12/1958 | Kirshenbaum et al. | 260/448 AD |
| 3,042,696 | 7/1962 | Aldridge | 260/448 AD |
| 3,087,954 | 4/1963 | McClaflin | 260/448 AD |
| 3,357,791 | 12/1967 | Napier | 23/143 |
| 3,385,663 | 5/1968 | Hughes | 23/143 |

FOREIGN PATENTS OR APPLICATIONS 931,936   7/1963   Great Britain............................23/143

OTHER PUBLICATIONS

Groggins, " Unit Processes In Organic Synthesis," 5th Edition, 1958, pages 752– 755.

*Primary Examiner*—M. Weissman
*Attorney*—Stevens, Davis, Miller & Mosher

[57] ABSTRACT

An improvement in a method for separating a hydrolysis product of an aluminum alkoxide into two layers of a higher alcohol layer and an aqueous layer containing readily precipitatable hydrated alumina in a suspended state. The hydrolysis reaction mixture is heated, either during or after the hydrolysis, at a temperature of 130°–250° C. in the presence of an ammonium, sodium or potassium salt of carbonic acid, hydrochloric acid, nitric acid, sulfuric acid, hydrobromic acid, phosphoric acid, formic acid, acetic acid or oxalic acid. The hydrated alumina is separated from the aqueous layer and the separated hydrated alumina is markedly low in content of impurities of organic matters.

8 Claims, No Drawings

METHOD FOR SEPARATING ALCOHOLS AND HYDRATED ALUMINA FROM HYDROLYSTS PRODUCTS OF ALUMINUM ALKOXIDES

FIELD OF THE INVENTION

This invention relates to a method for separating alcohols and hydrated alumina from hydrolysis products of aluminum alkoxides. In one aspect, the invention pertains to a novel process for producing alcohols and hydrated alumina by the hydrolysis of aluminum alkoxides.

PRIOR ART

A process for producing higher alcohols and hydrated alumina by hydrolyzing an aluminum alkoxide with the addition of a suitable amount of water and separating the higher alcohols and hydrated alumina from the reaction product comprising an alcohol layer and an aqueous layer containing the hydrated alumina in a suspended state, has been well known. The hydrated alumina obtained by such a process has been used chiefly as a starting material for catalyst carriers. On the other hand, a higher alcohol has been used as a valuable raw material for vinyl resin plasticizer, a higher alcohol type detergent, alkylbenzene type detergent, etc.

According to the above process, however, the separation of the higher alcohol layer from the aqueous layer was incomplete, and the hydrated alumina migrated into the higher alcohol to form, between the higher alcohol layer and the aqueous layer, an emulsion layer comprising the higher alcohol, the hydrated alumina and water. Further, the hydrated alumina obtained according to such a process was in the form of a gel and hence was quite difficult to filtrate, and the aqueous layer could not be completely separated from the hydrated alumina even when the reaction product was subjected to centrifugal separation. Moreover, the hydrated alumina contained large quantities of organic matter. This not only resulted in the loss of higher alcohol but also became a cause for coloration of the hydrated alumina.

In order to overcome such drawbacks, there have been known, as disclosed in, for example, German Pat. No. 1,170,388 and French Pat. No. 1,391,644, processes in which the hydrolysis was effected in the presence of a mixture of water and a solvent soluble in both the resulting higher alcohol and water, e.g., ethyl alcohol, propyl alcohol or butyl alcohol, to form readily filterable hydrated alumina, which was then collected by filtration and was washed with the above mentioned solvent to extract and recover the higher alcohol in the hydrated alumina.

Even with the above processes, however, it was extremely difficult to reduce the amount of organic matters contained in the hydrated alumina to less than 2 percent by weight. Moreover, the above processes had such drawbacks that the expensive solvent was required in a large amount and that the solvent used should be separated and recovered from the products, i.e., higher alcohol and hydrated alumina, according to extremely complex procedures.

SUMMARY OF THE INVENTION

Under such actual circumstances as mentioned above, the present inventors made various studies to find a method for the economical production of alcohols and hydrated alumina. According to the present invention, hydrolysis products of aluminum alkoxides are completely separated with ease into two layers, i.e., an alcohol layer and a water layer in which hydrated alumina is suspended; the hydrated alumina does not substantially migrate into the alcohol; the separation of the hydrated alumina from the hydrolysis product is extremely easy; the organic matter content of the hydrated alumina is markedly low; and any purification by use of an organic solvent is not required at all.

One object of the present invention is to provide an economical method for separating from each other higher alcohols and hydrated alumina which are hydrolysis products of aluminum alkoxides.

Another object of the invention is to provide a method for producing alcohol and hydrated alumina which is markedly low in organic matter content, from aluminum alkoxides.

A further object of the invention is to provide an improved method for the hydrolysis of aluminum alkoxides to obtain alcohols and hydrated alumina.

These and other objects will become clearer from the detailed explanation that follows.

That is, the present invention provides a method for separating respectively alcohols having four to 20 carbon atoms and hydrated alumina from hydrolysis products of an aluminum alkoxide containing at least one alkoxy group having four to 20 carbon atoms, in which method, the alcohol is readily separated from the hydrated alumina by subjecting the hydrolysis product to heat treatment at a temperature of 130°–250° C., in the presence of a salt. The aluminum alkoxide used in the present invention is represented by the formula, $RR'AlOR''$ wherein R and R' respectively are same or different alkyls or alkoxys having four to 20 carbon atoms or hydrogen and R'' is an alkyl having four to 20 carbon atoms. As aluminum alkoxides, it is possible to use not only those in pure form but also those in the form of mixtures containing various hydrocarbon groups in most cases, for example, like aluminum alkoxides obtained by the oxidation of alkyl growth products of alkylaluminums. Further, such aluminum alkoxides are obtained also in the form of solid or of solution in organic solvents. In the present method, however, the compounds may be used in any forms of solid and solution.

Preferable examples of aluminum alkoxides to be employed in the present invention are aluminum amyloxide, aluminum hexyloxide, aluminum octyloxide, aluminum decyloxide, aluminum dodecyloxide, aluminum tetradecyloxide, aluminum hexadecyloxide, aluminum octadecyloxide and the like.

In the present invention, the alcohols obtained by the hydrolysis of the aluminum alkoxides are alkyl alcohols having alkyl groups corresponding to the alkoxy groups in the aforesaid aluminum alkoxides.

In the hydrolysis of aluminum alkoxides having alkyl groups, alkanes corresponding to said alkyl groups are formed, while in the hydrolysis of those having hydrogen atoms, hydrogen is formed. In the above cases, the alkanes remain in the reaction system in the form of a mixture with the higher alcohol or are discharged out of the system in the form of gas. In the case of hydrogen, it is discharged out of the reaction system.

The salts to be employed in the present invention are ammonium salt, sodium salt and potassium salt of carbonic acid, hydrochloric acid, nitric acid, sulfuric acid, hydrobromic acid, phosphoric acid, formic acid, acetic acid and oxalic acid. Preferable examples are sodium carbonate, sodium hydrogen carbonate, sodium chloride, sodium nitrate, sodium sulfate, sodium hydrogen sulfate, sodium bromide, sodium phosphate, disodium hydrogen phosphate, sodium dihydrogen phosphate, sodium formate, sodium acetate, sodium oxalate, potassium carbonate, potassium hydrogen carbonate, potassium chloride, potassium nitrate, potassium sulfate, potassium hydrogen sulfate, potassium bromide, potassium phosphate, dispotassium hydrogen phosphate, potassium dihydrogen phosphate, potassium formate, potassium acetate, potassium oxalate, ammonium carbonate, ammonium hydrogen carbonate, ammonium hydrogen carbonate carbamate, ammonium chloride, ammonium nitrate, ammonium sulfate, ammonium hydrogen sulfate, ammonium bromide, ammonium phosphate, diammonium hydrogen phosphate, ammonium dihydrogen phosphate, ammonium formate, ammonium acetate, ammonium oxalate.

The amount of the above-mentioned salt is decided in consideration of effect and economy, but is, in general, at least 0.05 mole, preferably from 0.1 to 5 moles, per mole of the starting aluminum alkoxide.

The treating temperature adopted in the present invention is from 130° to 250° C., preferably from 150° to 230° C. If the temperature is below 130° C., an emulsion layer comprising a part of the resulting hydrated alumina, alcohol and water is formed, even when a salt is made present, between the alcohol layer which is an upper layer and the aqueous salt solution layer which is a lower layer. Further, the hydrated alumina obtained is in the form of a gel and hence is quite difficult to separate from the aqueous suspension. Moreover, the hydrated alumina formed contains a large amount of alcohol which brings about not only the loss of alcohol but also the degradation in purity of the hydrated alumina.

Generally, when the heat treatment is effected at 130°–250° C., no such emulsion as mentioned above is formed and the separation of the alcohol layer from the aqueous salt solution layer can be completely effected without any migration of hydrated alumina into the alcohol. Further, the hydrated alumina formed becomes quite easy to precipitate and filtrate and is low in content of organic matter. Such behaviors of hydrated alumina are further improved with increasing treatment temperature within the above-mentioned range. As the treatment temperature increases above the range, however, the pressure in the system also increases to bring about disadvantages from the standpoint of equipments, and the alcohol also is deteriorated in quality. It is therefore necessary to decide a proper temperature according to the kind of alcohol obtained.

Treatment at such a high temperature as 130°–250° C. cooperates with the action of the salt employed to vary the properties of hydrated alumina formed by the hydrolysis of aluminum alkoxides. Accordingly, a product obtained by the conventional hydrolysis of an aluminum alkoxide may be treated at a temperature of 130°–250° C. in the presence of a salt in the form of a powder or an aqueous solution. The hydrolysis is, for example, carried out by stirring an aluminum alkoxide in the presence of a theoretical or more amount of water at a temperature of a room temperature to 130° C. for at least 15 minutes, if necessary in an autoclave. In this conventional hydrolysis it is necessary to carry out the hydrolysis at a lower temperature than 130° C., because if the hydrolysis is carried out at a higher temperature than 130° C., hydrated alumina becomes a crystalline form and the effect of the high-temperature treatment in the presence of a salt of the present invention is not obtained.

Alternatively, the heat treatment may be effected by reacting the aluminum alkoxide with an aqueous solution containing said salt at a temperature of 130°–250° C. In short, it is necessary that, at the time of the hydrolysis of the aluminum alkoxide, the temperature should be 130°–250° C. and the salt should be made present in the system.

The treatment time at such a high temperature as 130°–250° C., varies depending on reaction conditions. In general, it requires at least 15 minutes, preferably 30 to 60 minutes.

The amount of water to be used for the hydrolysis of aluminum alkoxide may be in excess of the theoretical amount. If possible, however, it is desirable that the amount of water is selected from the range of 10–100 moles per mole of the aluminum alkoxide, in general, in order that the compound is completely reacted and the reaction vessel is not made unnecessarily large. In case the amount of water is less than about 20 moles per mole of aluminum alkoxide, the resulting hydrated alumina is sometimes brought into the form of a paste. In such a case, however, after the heat treatment, water is added to the hydrolysis product and the mixture is stirred, whereby the hydrated alumina is readily suspended in the aqueous layer and does not remain in the alcohol, and thus the alcohol completely separates from the aqueous layer containing hydrated alumina and salt. It is simple and convenient to effect the hydrolysis of aluminum alkoxide in an autoclave. In the heat treatment, the reaction system containing the alcohol, hydrated alumina and a solution of salt is desirably stirred to such an extent as not to destroy the aggregated particles of hydrated alumina.

The reaction product, which has completed such a heat treatment as mentioned above, is allowed to stand as it is, and is then subjected to simple separation operation, whereby only the alcohol can be separated and recovered. On the other hand, the hydrated alumina can be saparated by filtration from the solution of salt. These separation operations may be effected simultaneously, using such a means as, for example, a decanter.

The hydrated alumina obtained in accordance with the present method is crystalline and shows a boehmite structure when observed by means of X-rays. Accordingly, it is markedly less in content of organic matters and is not required to be washed with an organic solvent. The hydrated alumina obtained according to the present method can be reduced in organic carbon content to less than 1 percent by weight by mere washing several times with water.

As described above, in accordance with the present invention, a hydrolysis product of aluminum alkoxide is subjected to heat treatment, either during or after the hydrolysis, in the presence of a salt, whereby the resulting product completely separates into two layers of an alcohol layer and an aqueous layer in which hydrated alumina is suspended, and the hydrated alumina does not substantially migrate into the alcohol. Moreover, the hydrated alumina is precipitatable with marked ease and thus becomes filterable, is extremely less in content of organic matters, and is not required to be purified with an organic solvent. Thus, the alcohol and hydrated alumina can be economically obtained. These are the advantages of the present method.

The present invention is illustrated in further detail below with reference to examples.

EXAMPLE 1

Two hundred gram of trioctyloxyaluminum and 300 cc. of an aqueous solution containing 0.2 mole/l. of sodium carbonate were added to a 1-liter autoclave. The mixture was heated to 180° C. with stirring to effect hydrolysis. After 30 minutes, the stirring was discontinued and the hydrolysis product was allowed to stand. By merely allowing to stand, the hydrolysis product completely separated into an upper layer comprising octanol and a lower layer comprising an aqueous sodium carbonate solution containing hydrated alumina precipitated therein. Since the hydrated alumina had precipitated in the aqueous sodium carbonate solution, the upper layer was a clear supernatant layer. The thus-formed octanol and sodium carbonate solution were separated by decantation from the hydrated alumina. The remaining hydrated alumina was added to and dispersed in about 500 cc. of distilled water, and the dispersion was stirred, was allowed to stand and the clear supernatant layer was separated by decantation from hydrated alumina (precipitated therein). This operation was repeated three times, whereby the alcohol, which had adhered to the hydrated alumina, was separated substantially completely. The thus-obtained hydrated alumina was dried at 110° C. for 1 hour to obtain 29.5 g. of purified hydrated alumina. The ignition loss of the hydrated alumina was 17.3 percent by weight and the organic carbon content thereof was 0.3 percent by weight. The hydrated alumina was subjected to X-ray analysis to find that it had a boehmite structure. The octanol was separated from the aqueous sodium carbonate solution by use of a separating funnel. The amount of the octanol obtained was 185 g. Further, in the case where potassium carbonate was used in place of the above-mentioned sodium carbonate, substantially the same results as above were obtained, as well.

For comparison, trioctyloxyaluminum was hydrolyzed under the same conditions as above, except that 300 cc. of water was used in place of the aqueous sodium carbonate solution. In this case, however, an emulsion layer comprising octanol, water and hydrated alumina was formed between an octanol layer and an aqueous layer. Further, hydrated alumina suspended in the aqueous layer was in the form of a colloid and could not be separated even by means of a centrifugal precipitator. The hydrolysis product was further charged at normal temperature with 50 cc. of an aqueous solution containing 1.2 mole/l. of sodium carbonate, was stirred and was then allowed to stand, but the above-mentioned emulsion did not disappear.

EXAMPLE 2

Three hundred cc. of an aqueous solution containing 0.2 mole/l. of ammonium carbonate was charged into a 1-liter autoclave. To the solution, 200 g. of trioctyloxyaluminum was gradually added, and the hydrolysis thereof was effected, with stirring at 30° C. After 60 minutes, the hydrolysis product was allowed to stand, whereby the whole of the hydrolysis product became pasty and scarcely separated into an alcohol layer and an aqueous layer. Subsequently, the pasty hydrolysis product was treated in an autoclave at 180° C. for 30 minutes and was then allowed to stand, whereby the hydrolysis product completely separated, without any further treatment, into an alcohol layer and an aqueous ammonium carbonate solution layer, and hydrated alumina precipitated in the aqueous ammonium carbonate solution. Thereafter, the same aftertreatments as in Example 1 were effected to obtain 183 g. of octanol and 29 g. of hydrated alumina. The ignition loss of the thus-obtained hydrated alumina was 17.4 percent by weight and the organic carbon content thereof was 0.35 percent by weight. As the result of X-ray analysis, it was found that the hydrated alumina had a boehmite structure.

For comparison, a product obtained by hydrolyzing trioctyloxyaluminum with the above-mentioned ammonium carbonate solution at 30° C. was treated in a centrifugal precipitator, whereby a large amount of an emulsion layer comprising alcohol, water and hydrated alumina was formed between an alcohol layer and an aqueous ammonium carbonate solution. Other hydrated alumina separated from the alcohol layer and precipitated in the aqueous ammonium carbonate solution. These hydrated aluminas were in the form of gels and could not be separated not only by filtration but also by decantation. In order to secure the data thereof, however, the hydrolysis product was washed three times with 500 cc. of ethanol to obtain 32 g. of dry hydrated alumina. The ignition loss of the thus-obtained hydrated alumina was 30.9 percent by weight and the organic carbon content thereof was 4.0 percent weight. According to the results of X-ray analysis, the hydrated alumina had a pseudoboehmite structure. Further, 136 g. of octanol was obtained from the alcohol layer.

EXAMPLE 3

Two hundred cc. of water as charged into a 1-liter beaker. To the water, 200 g. of trioctyloxyaluminum was gradually added and the hydrolysis thereof was effected with stirring at 30° C. After 60 minutes, the hydrolysis product was allowed to stand, but it did not separate into layers at all. This pasty hydrolysis product was added to an autoclave, was charged with 100 cc. of an aqueous solution containing 2.0 moles/l. of sodium hydrogen carbonate, and was heated with stirring at 180° C. for 30 minutes. In this case, the product completely separated, by merely allowing it to stand, into an alcohol layer and an aqueous sodium hydrogen carbonate solution layer, and hydrated alumina precipitated in the sodium hydrogen carbonate solution. Thereafter, the same aftertreatments as in Example 1 were effected to obtain 182.0 g. of octanol and 28.9 g. of hydrated alumina. The ignition loss of the thus obtained hydrated alumina was 17.4 percent by weight and the organic carbon content thereof was 0.4 percent by weight.

EXAMPLE 4

Two hundred gram of trioctyloxyaluminum and 300 cc. of an aqueous solution containing 0.35 mole/l. of sodium chloride was added to a 1-liter autoclave. The mixture was heated with stirring at 160° C. for 60 minutes to effect hydrolysis. Subsequently, the hydrolysis product was allowed to stand, whereby the product completely separated into an alcohol layer and an aqueous sodium chloride solution layer containing hydrated alumina precipitated therein. Thereafter, the same aftertreatments as in Example 1 were effected to obtain 182.0 g. of octanol and 30.2 g. of hydrated alumina. The ignition loss of the thus-obtained hydrated alumina was 19.3 percent by weight and the organic carbon content was 0.35 percent by weight. Further, in the case where an aqueous sodium bromide solution was used in place of the aqueous sodium chloride solution, substantially the same results as above were obtained, as well.

EXAMPLE 5

One hundred forty gram of a mixed aluminum alkoxide containing an alkoxy group of six to 20 carbon atoms and having an aluminum content of 5.0 percent by weight and 420 cc. of an aqueous solution containing 1.0 mole/l. of sodium sulfate were charged into a 1-liter autoclave, and the mixture was heated with stirring at 140° C. to effect hydrolysis. After 60 minutes, the hydrolysis product was allowed to stand, whereby the product completely separated into an alcohol layer and an aqueous sodium sulfate solution layer containing hydrated alumina precipitated therein. Thereafter, the same aftertreatments as in Example 1 were effected to obtain 128 g. of a mixed alcohol having six to 20 carbon atoms and 16.5 g. of hydrated alumina. The ignition loss of the thus-obtained hydrated alumina was 21.5 percent by weight and the organic carbon content thereof was 0.5 percent by weight.

Further, in the case where an aqueous sodium nitrate solution was used in place of the aqueous sodium sulfate solution, substantially the same results as above were obtained, as well.

EXAMPLE 6

Three hundred gram of trioctyloxyaluminum and 300 cc. of an aqueous solution containing 0.75 mole/l. of sodium phosphate were added to a 1-liter autoclave, and the mixture was heated with stirring at 200° C. to effect hydrolysis. After 40 minutes, the hydrolysis product was allowed to stand, whereby the product comperely separated into an alcohol layer and an aqueous sodium phosphate solution layer containing hydrated alumina precipitated therein. Thereafter, the same aftertreatment as in Example 1 was effected to obtain 274 g. of octanol and 42.8 g. of hydrated alumina. The ignition loss of the thus-obtained hydrated alumina was 15.8 percent by weight and the organic carbon content thereof was 0.27 percent by weight.

For comparison, trioctyloxyaluminum was hydrolyzed under the same conditions as above, except that 300 cc. of an aqueous solution containing 0.05 mole/l. of sodium phosphate was used in place of 300 cc. of the aqueous solution containing 0.75 mole/l. of sodium phosphate. Thereafter, the hydrolysis product was allowed to stand, whereby the product separated into an alcohol layer and an aqueous sodium phosphate solution layer, but the resulting hydrated alumina was low in precipitability, and quite a long period of time was required before a clear sodium phosphate solution layer had been obtained.

EXAMPLE 7

Three hundred gram of trioctyloxyaluminum and 300 cc. of an aqueous solution containing 0.75 mole/l. of ammonium phosphate were added to a 1-liter autoclave, and the mixture was heated with stirring at 200° C. to effect hydrolysis. After 40 minutes, the hydrolysis product was allowed to stand, whereby the product was completely separated into an alcohol layer and an aqueous ammonium phosphate solution layer containing hydrated alumina precipitated therein. Thereafter, the same aftertreatments as in Example 1 were effected to obtain 271 g. of octanol and 42.6 g. of hydrated alumina. The ignition loss of the thus-obtained hydrated alumina was 15.8 percent by weight and the organic carbon content thereof was 0.29 percent by weight.

EXAMPLE 8

One hundred and forty gram of trioctyloxyaluminum and 420 cc. of an aqueous solution containing 0.4 mole/l. of sodium acetate were added to an autoclave, and the mixture was heated with stirring at 200° C., to effect hydrolysis. After 40 minutes, the hydrolysis product was allowed to stand, whereby the product completely separated into an alcohol layer and an aqueous sodium acetate solution layer containing hydrated alumina precipitated therein. Thereafter, the same treatments as in Example 1 were effected to obtain 128 g. of octanol and 20 g. of hydrated alumina. The ignition loss of the thus-obtained hydrated alumina was 15.8 percent by weight and the organic carbon content thereof was 0.22 percent by weight.

Further, trioctyloxyaluminum was hydrolyzed under the same conditions as above, except that an aqueous solution containing 0.4 mole/l. of potassium or ammonium acetate was used in place of the aqueous solution containing 0.4 mole/l. of sodium acetate, whereby substantially the same results as in the case of the aqueous sodium acetate solution were obtained.

EXAMPLE 9

Two hundred gram of trioctyloxyaluminum and 300 cc. of an aqueous solution containing 0.4 mole/l. of sodium oxalate were added to a 1-liter autoclave, and the mixture was heated with stirring at 180° C. to effect hydrolysis. After 60 minutes, the stirring was discontinued and the hydrolysis product was allowed to stand, whereby the product completely separated into an alcohol layer and an aqueous sodium oxalate solution layer containing hydrated alumina precipitated therein. Thereafter, the same aftertreatments as in Example 1 were effected to obtain 184 g. of octanol and 29.4 g. of a hydrated alumina. The ignition loss of the thus-obtained hydrated alumina was 17.3 percent by weight and the organic carbon content thereof was 0.32 percent by weight.

Further, trioctyloxyaluminum was hydrolyzed under the same conditions as above, except that an aqueous solution containing 0.4 mole/l. of sodium formate was used in place of the aqueous solution containing 0.4 mole/l. of sodium oxalate, whereby the same results as in the case of the aqueous sodium oxalate solution were obtained.

EXAMPLE 10

Two hundred gram of tri-n-hexyloxyaluminum and 400 cc. of an aqueous solution containing 0.25 mole/l. of ammonium chloride were added to a 1-liter autoclave, and the mixture was heated with stirring at 160° C. for 30 minutes to effect hydrolysis. The hydrolysis product completely separated, by merely allowing it to stand, into an alcohol layer and an aqueous ammonium chloride solution layer containing hydrated alumina precipitated therein. Thereafter, the same aftertreatments as in Example 1 were effected to obtain 181 g. of hexanol and 37.7 g. of hydrated alumina. The ignition loss of the thus-obtained hydrated alumina was 19.3 percent by weight and the organic carbon content thereof was 0.30 percent by weight. Substantially the same results as above were obtained as well when ammonium nitrate or ammonium sulfate was used in place of the ammonium chloride.

EXAMPLE 11

Two hundred gram of tri-n-decyloxyaluminum and 400 cc. of an aqueous solution containing 0.2 mole/l. of potassium sulfate were added to a 1-liter autoclave, and the mixture was heated with stirring at 180° C. for 40 minutes to effect hydrolysis. The hydrolysis product completely separated, by merely allowing it to stand, into an alcohol layer and an aqueous potassium sulfate solution layer. Thereafter, the same aftertreatments as in Example 1 were effected to obtain 183 g. of decanol and 24.2 g. of hydrated alumina. The ignition loss of the thus-obtained hydrated alumina was 17.5 percent by weight and the organic carbon content thereof was 0.51 percent by weight.

Substantially the same results as above were obtained, as well, when potassium nitrate or potassium chloride was used in place of the potassium sulfate.

EXAMPLE 12

One hundred and sixty gram of tri-n-dodecyloxyaluminum and 400 cc. of an aqueous solution containing 0.17 mole/l. of potassium phosphate were added to a 1-liter autoclave, and the mixture was heated with stirring at 200° C. for 40 minutes to effect hydrolysis. The hydrolysis product completely separated, by merely allowing it to stand, into an alcohol layer and an aqueous potassium phosphate solution layer containing hydrated alumina precipitated therein. Thereafter, the same aftertreatments as in Example 1 were effected to obtain 147 g. of dodecanol and 16.3 g. of hydrated alumina. The ignition loss of the thus-obtained hydrated alumina was 16.3 percent by weight and the organic carbon content thereof was 0.55 percent by weight.

We claim:

1. A method for separating alcohols having four to 20 carbon atoms and hydrated alumina respectively from a hydrolysis product of aluminum alkoxide, said product being obtained by reacting aluminum alkoxide represented by the formula,

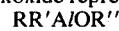

wherein R and R' respectively are same or different alkyls or alkoxys having four to 20 carbon atoms or hydrogen and R'' is an alkyl having four to 20 carbon atoms, with water, thereby forming hydrated alumina and alcohol having alkyl group corresponding to the alkoxy group of the aluminum alkoxide, characterized in that (1) the hydrolysis is effected by reacting the aluminum alkoxide with water at a temperature of 130° to 250° C. in the presence of 0.05 to 5 moles, per mole of the aluminum alkoxide, of a salt selected from the group consisting of ammonium, sodium and potassium salts of carbonic acid, hydrochloric acid, nitric acid, sulfuric acid, hydrobromic acid, phosphoric acid, formic acid, acetic acid and oxalic acid, (2) the reaction mixture is allowed to stand as it is, (3) the resulting alcohol layer which is formed as an upper layer is separated from the resulting aqueous solution layer containing hydrated alumina precipitated therein which is formed as a lower layer, and (4) the hydrated alumina is separated from the aqueous solution layer by filtration.

2. A method according to claim 1, wherein the hydrolysis is effected at a temperature of 150° to 230° C.

3. A method according to claim 1, wherein the salt is one member selected from the group consisting of ammonium carbonate, ammonium chloride, ammonium sulfate, ammonium nitrate, ammonium phosphate, ammonium acetate, sodium carbonate, sodium hydrogencarbonate, sodium chloride, sodium sulfate, sodium nitrate, sodium acetate, sodium phosphate, sodium bromide, sodium oxalate, sodium formate, potassium carbonate, potassium chloride, potassium sulfate, potassium nitrate, potassium acetate and potassium phosphate.

4. A method according to claim 1, wherein the aluminum alkoxide is one member selected from the group consisting of aluminum amyloxide, aluminum hexyloxide, aluminum octyloxide, aluminum decyloxide, aluminum dodecyloxide, aluminum tetradecyloxide, aluminum hexadecyloxide and aluminum octadecyloxide.

5. A method for separating alcohols having four to 20 carbon atoms and hydrated alumina respectively from a hydrolysis product of aluminum alkoxide, said product being obtained by reacting aluminum alkoxide represented by the formula,

wherein R and R' respectively are same or different alkyls or alkoxys having four to 20 carbon atoms or hydrogen and R'' is an alkyl having four to 20 carbon atoms, with water, thereby forming hydrated alumina and alcohol having alkyl group corresponding to the alkoxy group of the aluminum alkoxide, characterized in that (1) the hydrolysis is effected by reacting the aluminum alkoxide with water at a temperature up to 130° C., (2) the hydrolysis product obtained is heated at a temperature of 130° to 250° C. in the presence of 0.05 to 5 moles per mole of the aluminum alkoxide, of a salt selected from the group consisting of ammonium, sodium and potassium salts of carbonic acid, hydrochloric acid, nitric acid, sulfuric acid, hydrobromic acid, phosphoric acid, formic acid, acetic acid and oxalic acid, (3) the reaction mixture is allowed to stand as it is, (4) the resulting alcohol layer which is formed as an upper layer is separated from the resulting aqueous solution layer containing hydrated alumina precipitated therein which is formed as a lower layer, and (5) the hydrated alumina is separated from the aqueous solution layer by filtration.

6. A method according to claim 5, wherein the hydrolysis product is heated at a temperature of 150° to 230° C.

7. A method according to claim 5, wherein the salt is one member selected from the group consisting of ammonium carbonate, ammonium chloride, ammonium sulfate, ammonium nitrate, ammonium phosphate, ammonium acetate, sodium carbonate, sodium hydrogencarbonate, sodium chloride, sodium sulfate, sodium nitrate, sodium acetate, sodium phosphate, sodium bromide, sodium oxalate, sodium formate, potassium carbonate, potassium chloride, potassium sulfate, potassium nitrate, potassium acetate and potassium phosphate.

8. A method according to claim 5, wherein the aluminum alkoxide is one member selected from the group consisting of aluminum amyloxide, aluminum hexyloxide, aluminum octyloxide, aluminum decyloxide, aluminum dodecyloxide, aluminum tetradecyloxide aluminum hexadecyloxide and aluminum octadecyloxide.

* * * * *